(12) United States Patent
Li et al.

(10) Patent No.: US 12,109,162 B2
(45) Date of Patent: Oct. 8, 2024

(54) ROPE-DRIVEN SOFT HAND FUNCTION REHABILITATION DEVICE

(71) Applicant: Southeast University, Jiangsu (CN)

(72) Inventors: Huijun Li, Jiangsu (CN); Yunxia Ouyang, Jiangsu (CN); Aiguo Song, Jiangsu (CN)

(73) Assignee: Southeast University, Jiangsu (CN)

( * ) Notice: Subject to any disclaimer, the term of this patent is extended or adjusted under 35 U.S.C. 154(b) by 868 days.

(21) Appl. No.: 17/279,608

(22) PCT Filed: Jul. 10, 2020

(86) PCT No.: PCT/CN2020/101210
§ 371 (c)(1),
(2) Date: Mar. 25, 2021

(87) PCT Pub. No.: WO2021/217886
PCT Pub. Date: Nov. 4, 2021

(65) Prior Publication Data
US 2022/0110815 A1  Apr. 14, 2022

(30) Foreign Application Priority Data

Apr. 27, 2020 (CN) .......................... 202010346306.8

(51) Int. Cl.
*A61H 1/02* (2006.01)
*B33Y 80/00* (2015.01)

(52) U.S. Cl.
CPC ............ *A61H 1/0288* (2013.01); *B33Y 80/00* (2014.12); *A61H 2201/149* (2013.01); *A61H 2201/1638* (2013.01); *A61H 2201/165* (2013.01)

(58) Field of Classification Search
CPC .................................................. A61H 1/0288
See application file for complete search history.

(56) References Cited

U.S. PATENT DOCUMENTS

| 3,638,011 A | 1/1972 | Bain et al. |
| 7,163,308 B2 | 1/2007 | Ferrari et al. |
| (Continued) | | |

FOREIGN PATENT DOCUMENTS

| CN | 105496728 | 4/2016 |
| CN | 106214418 | 12/2016 |
| (Continued) | | |

OTHER PUBLICATIONS

Mark, J. E., & Erman, B. (Eds.). (2005). Science and technology of rubber. Chapter 9. Elsevier Science & Technology. (Year: 2005).*

(Continued)

*Primary Examiner* — Bradley H Philips
*Assistant Examiner* — Nicholas B. Engel
(74) *Attorney, Agent, or Firm* — JCIP GLOBAL INC.

(57) ABSTRACT

A rope-driven soft hand function rehabilitation device includes four finger exoskeleton mechanisms, a thumb exoskeleton mechanism, and a soft rubber glove. An index-finger exoskeleton mechanism includes an index-finger distal phalanx loop, an index-finger middle phalanx loop, and an index-finger proximal phalanx loop which are mutually connected via a hinge structure. The thumb exoskeleton mechanism includes a thumb proximal phalanx loop and a thumb distal phalanx loop which are connected via a hinge structure. The rope is fastened to the hand function rehabilitation device via an aluminum sleeve which prevents the rope from slipping off during finger flexion/extension and abduction/adduction when the fingers are pulled by the rope at the palm and the hand back.

8 Claims, 3 Drawing Sheets

(56) References Cited

U.S. PATENT DOCUMENTS

| | | | | |
|---|---|---|---|---|
| 9,375,382 | B2* | 6/2016 | Fausti | A61H 1/0288 |
| 11,357,691 | B2* | 6/2022 | Lindemann | A61H 1/0288 |
| 2012/0029399 | A1* | 2/2012 | Sankai | A61H 1/0288 601/40 |
| 2013/0310717 | A1* | 11/2013 | Ranky | A61H 1/0288 601/40 |
| 2016/0296345 | A1* | 10/2016 | Deshpande | A61F 2/586 |
| 2017/0168565 | A1* | 6/2017 | Cohen | A61B 5/0022 |
| 2019/0090558 | A1* | 3/2019 | Xu | A41D 13/1176 |
| 2020/0360169 | A1* | 11/2020 | Kelly | A61F 5/0127 |
| 2023/0166391 | A1* | 6/2023 | Chauhan | A61H 1/0288 601/5 |

FOREIGN PATENT DOCUMENTS

| | | |
|---|---|---|
| CN | 106618953 | 5/2017 |
| CN | 106943277 | 7/2017 |
| CN | 106956283 | 7/2017 |
| CN | 206761899 | 12/2017 |
| CN | 108214520 | 6/2018 |
| CN | 109044735 | 12/2018 |
| CN | 109481236 | 3/2019 |
| CN | 109549819 | 4/2019 |
| CN | 110731880 | 1/2020 |
| KR | 20170106039 | 9/2017 |
| TW | M519533 | 4/2016 |
| WO | 2010083389 | 7/2010 |
| WO | 2013086023 | 6/2013 |
| WO | 2018169111 | 9/2018 |

OTHER PUBLICATIONS

"International Search Report (Form PCT/ISA/210) of PCT/CN2020/101210," mailed on Dec. 10, 2020, pp. 1-5.

* cited by examiner

ROPE-DRIVEN SOFT HAND FUNCTION REHABILITATION DEVICE

CROSS-REFERENCE TO RELATED APPLICATION

This application is a 371 of international application of PCT application serial no. PCT/CN2020/101210, filed on Jul. 10, 2020, which claims the priority benefit of China application no. 202010346306.8, filed on Apr. 27, 2020. The entirety of each of the above mentioned patent applications is hereby incorporated by reference herein and made a part of this specification.

BACKGROUND

Technical Field

The present invention relates to the field of finger rehabilitation; and designs a soft hand function rehabilitation device and especially designs a rope-driven soft hand function rehabilitation device.

Description of Related Art

The number of patients with limited hand function increases in recent years. Spinal cord injuries and strokes are the main causes of hand paralysis. The loss of hand function greatly reduces the patient's quality of life because the patient's hands cannot operate autonomously and the patient requires nursing staff to help with activities of daily living. The traditional manual treatment is far from meeting the rehabilitation needs of the patients, and one-to-one physician treatment is time-consuming and labor-intensive. Therefore, it is very urgent and necessary to design a suitable robot for hand motion rehabilitation.

Researchers at home and abroad have developed many hand motion rehabilitation robots which transfer the external force to the paralyzed hand to assist in proper movement of the hand. However, nearly 70% of these rehabilitation robots only support rehabilitation training of four fingers, and very few support rehabilitation of the thumb. The thumb is the key to the grasping function of the human hand. If the thumb is lost, 40% of the hand function is lost.

The conventional hand rehabilitation robot is usually formed by a metal mechanism and a motor with a large reduction ratio, and an actuator is placed on the human hand, which reduces the comfort of the patient during hand rehabilitation training and increases manufacturing costs.

To solve such a problem, the present invention combines rope drive and a soft structure based on biological properties of the hand, which replaces a connecting rod with the rope as a drive element, allows the actuator to be placed on a fixed base instead of the human hand, and uses the soft structure to further improve wearing tightness, thus improving the comfort of the patient during rehabilitation.

SUMMARY

The present invention aims to provide a rope-driven soft hand function rehabilitation device, which uses a rope to realize flexion/extension, abduction/adduction of finger joints, and further improves wearing tightness and comfort by using a soft exoskeleton structure.

To achieve the foregoing objective, the present invention provides the following technical solution. A rope-driven soft hand function rehabilitation device is provided, including four finger exoskeleton mechanisms, a thumb exoskeleton mechanism, and a soft rubber glove, where the four finger exoskeleton mechanisms include an index-finger exoskeleton mechanism, a middle-finger exoskeleton mechanism, a ring-finger exoskeleton mechanism, and a little-finger exoskeleton mechanism. By adjustment and optimization to the conventional rigid exoskeleton mechanism, the present invention designs the palm part as a soft exoskeleton structure while retaining the rigid exoskeleton structure of the finger parts, thus solving the size problem of the conventional rigid exoskeleton mechanism under the premise of ensuring force transmission and control. Thus, the rehabilitation device of the present invention can be worn more tightly and comfortably on the user's hand, and more easily adapt to the user's hand. After analysis on the anatomical structure of the human hand and the trajectory of human fingertip movement, a rope channel is disposed on the rehabilitation device, so that the hand of a patient is driven to move within a maximum functional range when an actuator drives the rope to move.

As an improvement to the present invention, the soft rubber glove is tightly worn on the hand of a user by means of a buckle and strap, and the four finger exoskeleton mechanisms and the thumb exoskeleton mechanism are fastened to the fingers of the user with hook and loop fasteners in a size adjustable manner.

As an improvement to the present invention, the soft rubber glove includes a strap loop buckle, a strap, a Bowden wire insertion port, a pulley steering mechanism, an aluminum buckle, a soft-rubber index-finger extension channel, a soft-rubber thumb adduction channel, a soft-rubber thumb extension channel, a soft-rubber thumb abduction channel, a soft-rubber thumb flexion channel, a soft-rubber index-finger flexion channel, and a buckle mounting recess. The whole soft rubber glove is made of 30° soft rubber, has high flexibility, and can be tightly worn on the hand of the user. The buckle is mounted in the buckle mounting recess by using a pin, and a plurality of through holes is made in the strap. During wearing of the soft rubber glove, the strap is passed through the buckle, a tongue of the buckle is passed through one through hole of the strap to achieve fastening, and the remaining strap is inserted into the strap loop buckle. From the Bowden wire insertion port, the rope is threaded through the Bowden wire insertion port and is connected to the actuator. The soft-rubber index-finger extension channel, the soft-rubber thumb adduction channel, the soft-rubber thumb extension channel, the soft-rubber thumb abduction channel, the soft-rubber thumb flexion channel, and the soft-rubber index-finger flexion channel are provided on the surface of the soft rubber glove. Such a design mode combing the strap and buckle can easily adjust the tightness of the soft rubber glove. After study on the anatomical structure of the human hand and a fingertip movement trajectory, a rope trajectory of dragging the thumb and the index-finger is designed. Because the soft rubber cannot be made into a complicated structure, in order to facilitate doctors and patients to observe the movement of the rope in the soft rubber glove, the present invention adopts a segmented manner to design the soft-rubber index-finger extension channel, the soft-rubber thumb adduction channel, the soft-rubber thumb extension channel, the soft-rubber thumb abduction channel, the soft-rubber thumb flexion channel, and the soft-rubber index-finger flexion channel on the soft rubber glove. For ease of subsequent connection of the rope and the actuator, the Bowden wire insertion port is provided on the soft rubber glove. The rope is threaded through the Bowden wire insertion port and is connected to the actuator, avoiding the wire from directly contacting the human body and preventing possible secondary injuries. Moreover, the Bowden wire insertion port can effectively change a direction of the driving force, enabling arbitrary placement of the actuator.

As an improvement to the present invention, the index-finger exoskeleton mechanism includes an index-finger proximal phalanx loop, an index-finger middle phalanx loop, and an index-finger distal phalanx loop which are mutually connected via a hinge structure. Hook and loop fasteners are adhered inside each loop, which can change the size of the loop according to the finger thickness. A sensor platform is disposed on the index-finger distal phalanx loop, which facilitates placement of an attitude sensor in subsequent application of the invention. Index-finger extension channels are respectively disposed at the centers of top ends of the three loops, and corresponding to the center line of the index-finger of the human hand. The rope passes through the soft-rubber index-finger extension channel of the soft rubber glove and then through the index-finger extension channels, and finally is fastened in an aluminum buckle groove on the index-finger distal phalanx loop via an aluminum buckle. Index-finger flexion channels are respectively disposed at the two sides of the bottom end of each loop, and the centers of the channels are corresponding to the center line of the index-finger of the human hand. One rope passes through the soft-rubber index-finger flexion channel of the soft rubber glove, and then is converted into two sub-ropes via the aluminum buckle. Then the two sub-ropes respectively pass through the index-finger flexion channels at the two sides, and are finally fastened in the aluminum buckle groove on the index-finger distal phalanx loop via the aluminum buckle. A thumb adduction channel is disposed at the right side of the index-finger proximal phalanx loop. The rope passes through the soft-rubber thumb adduction channel of the soft rubber glove and then through the thumb adduction channel, and finally is fastened in an aluminum buckle groove on a thumb distal phalanx loop of the thumb exoskeleton mechanism. Hook and loop fasteners are adhered inside each loop, and used to change the size of the loop according to the finger thickness. A sensor platform is disposed on the index-finger distal phalanx loop, which facilitates placement of an attitude sensor in subsequent application of the invention.

As an improvement to the present invention, the thumb exoskeleton mechanism includes a thumb proximal phalanx loop and a thumb distal phalanx loop which are connected via a hinge mechanism, where the size of the loop is adjusted with hook and loop fasteners and a sensor platform is disposed on the thumb proximal phalanx loop. Thumb extension channels are disposed at the centers of the top ends of the two loops respectively, and corresponding to the center line of the thumb of the human hand. The rope passes through the soft-rubber thumb extension channel of the soft rubber glove and then through the thumb extension channels, and finally is fastened in the aluminum buckle groove on the thumb distal phalanx loop via an aluminum buckle. Thumb flexion channels are respectively disposed at the two sides of the bottom end of each loop, and the centers of the channels are corresponding to the center line of the thumb of the human hand. One rope passes through the soft-rubber thumb flexion channel of the soft rubber glove and then is converted into two sub-ropes via the aluminum buckle. Then the two sub-ropes respectively pass through the thumb flexion channels at the two sides, and are finally fastened in the aluminum buckle groove on the thumb distal phalanx loop via the aluminum buckle. A pulley steering mechanism is disposed at the right side of the thumb proximal phalanx loop. The rope runs through the soft-rubber thumb abduction channel of the soft rubber glove, then passes through the pulley steering mechanism, and is finally fastened in an aluminum buckle groove on the thumb proximal phalanx loop, so that the rope applies a force on the finger in a direction vertical to the finger, thus facilitating force transmission and control. A sensor platform is disposed on the thumb proximal phalanx loop, which facilitates placement of an attitude sensor in subsequent application of the invention.

As an improvement to the present invention, a rope aluminum sleeve groove is separately disposed on the tail ends of the four finger distal phalanx loops and the tail end of the thumb distal phalanx loop, to fix the tail end of the rope and prevent sway of the rope, thus improving rope control precision in later period.

As an improvement to the present invention, a through hole is made in the middle of the top end of each loop, and the rope passes through the through hole and is fixed at the tail end. When the rope is pulled, the fingers of the user are driven to extend. Two through holes are respectively made at two sides of the bottom end of each loop, and the two ropes respectively pass through the through holes to be fixed at the tail ends, and when the ropes are pulled, the fingers of the user are driven to flex.

As an improvement to the present invention, a diversion hole is provided at the right side of the index-finger proximal phalanx loop. The rope passes through the hole and is fixed on the thumb distal phalanx loop, and when the rope is pulled, the thumb of the user is adducted.

As an improvement to the present invention, a pulley steering mechanism is disposed at a right side of the thumb proximal phalanx loop, and is configured to change a rope tension direction, so that the rope applies a force on the finger in a direction vertical to the finger to abduct the thumb of the user, thus improving tension efficiency and reducing a parasitic force.

As an improvement to the present invention, the middle-finger exoskeleton mechanism, the ring-finger exoskeleton mechanism, and the little-finger exoskeleton mechanism are similar to the index-finger exoskeleton mechanism in structure. The soft rubber glove is a soft exoskeleton made of a soft rubber. When being used, the two exoskeleton mechanisms are aligned with center lines of the corresponding fingers and finger joints are exposed. Due to suppleness and flexibility of the material, the soft rubber glove can be worn tightly and is easily suitable for the hand of the user. The rope is fastened to the hand function rehabilitation device via an aluminum sleeve which prevents the rope from slipping off during finger flexion/extension and abduction/adduction when the fingers are pulled by the rope at the palm and the hand back.

The present invention has the following advantages and beneficial effects compared to the prior art: 1) In the rope-driven hand function rehabilitation device provided by the present invention, a palm part is made by using soft rubber into a soft exoskeleton structure, which solves the size problem of a rigid exoskeleton. The rehabilitation device of the present invention can be worn tightly and is easily suitable for the hand of the user, thus improving comfort of the user during rehabilitation training. 2) In the rope-driven hand function rehabilitation device provided by the present invention, the joints parts are made by means of 3D printing with lightweight resin and are mutually connected via a hinge structure. The interphalangeal joints are laterally designed and finger joints of the user are exposed, realizing center coincidence of exoskeleton joints and the interphalangeal joints. Thus, the present invention adds rigidity to the whole device while ensuring comfort and safety of the user, improving rope control precision in later period. 3) In the rope-driven hand function rehabilitation device provided by the present invention, after analysis on the anatomical structure of the human hand and the trajectory of human fingertip movement, a segmented rope channel is disposed on the soft rubber glove, so that the hand of a patient is driven to move within a maximum functional range when an actuator drives the rope to move. 4) By use of an end traction manner, the present invention can ignore the coupling relationship between the finger joints and directly drives compound movement, thus realizing various training modes, including flexion/extension of the thumb and the four fingers, abduction/adduction of the thumb, and opposition/reposition of the thumb. 5) The present invention uses a pulley mechanism and a curved channel to apply rope tension vertically on the fingers, reducing an impact of a parasitic force, facilitating force control and transmission, and improving tension efficiency.

DESCRIPTION OF THE EMBODIMENTS

The technical solutions provided by the present invention are described in detail below with reference to specific embodiments. It should be understood that the following specific embodiments are used only to illustrate the present invention and are not intended to limit the scope of the present invention.

Figure 1:
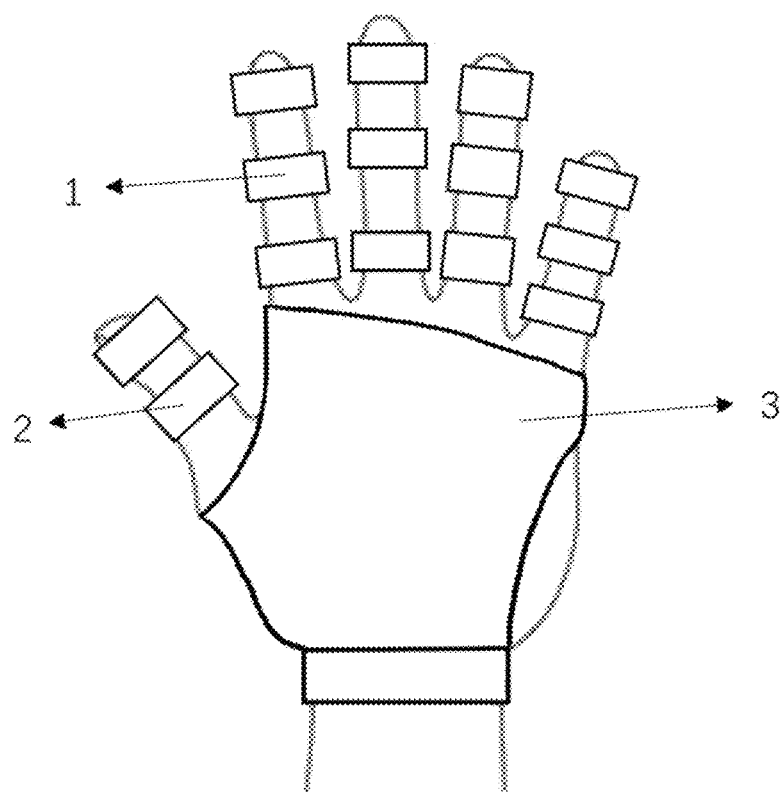
FIG. 1 is an overall schematic structural diagram of a rope-driven hand function rehabilitation device provided by the present invention.
Figure 2:
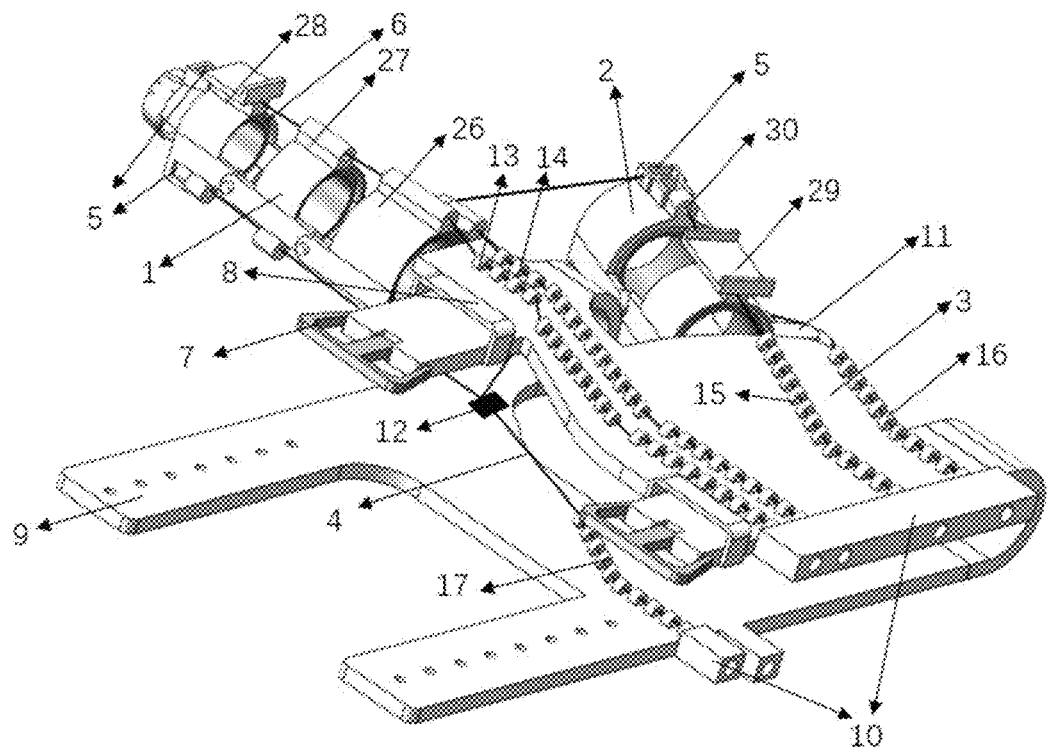
FIG. 2 is a specific implementation diagram of the present invention.

As shown in FIG. 1, a rope-driven soft hand function rehabilitation device provided by the present invention mainly includes a soft rubber glove 3, four finger exoskeleton mechanisms, and a thumb exoskeleton mechanism 2. The four finger exoskeleton mechanisms include an index-finger exoskeleton mechanism, a middle-finger exoskeleton mechanism, a ring-finger exoskeleton mechanism, and a little-finger exoskeleton mechanism. The four finger exoskeleton mechanisms are similar in structure, and thus are described by using the index-finger exoskeleton mechanism 1 as an example. The other three exoskeleton mechanisms are similar to the index-finger exoskeleton mechanism in structure, as shown in FIG. 2. The soft rubber glove 3 is made of a soft rubber, and is tightly worn on the hand of a user by means of a buckle and strap. The index-finger exoskeleton mechanism 1 and the thumb exoskeleton mechanism 2 are made by 3D printing with a nylon material, and are fastened to the fingers of the user with hook and loop fasteners 6 in a size adjustable manner.

Figure 3:
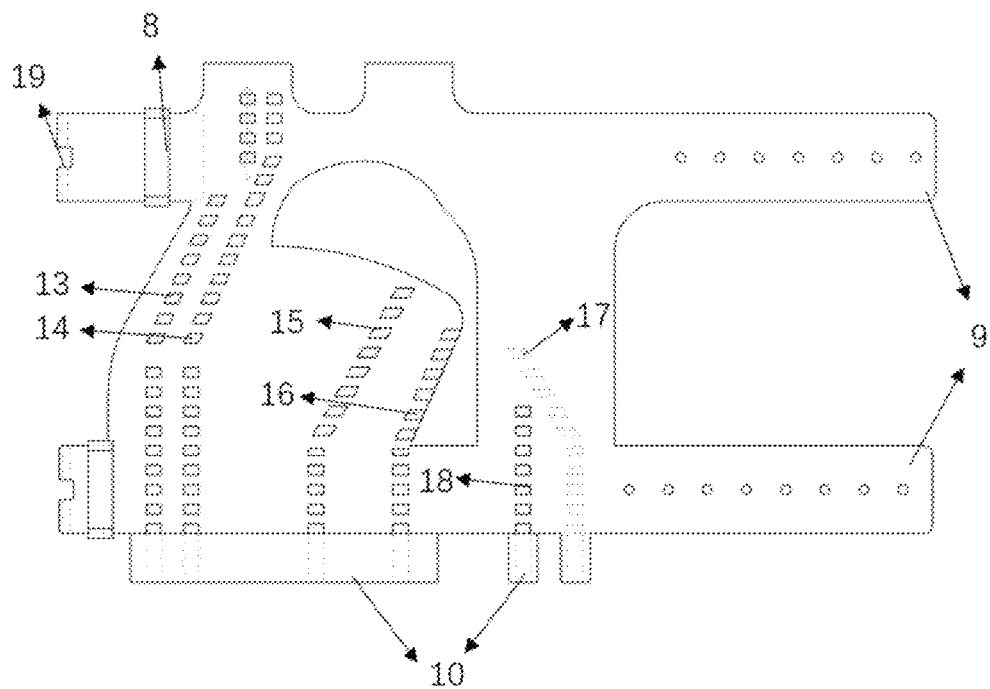
FIG. 3 is an expanded view of a soft rubber glove.

Specifically, as shown in FIG. 2 and FIG. 3, the soft rubber glove 3 includes a strap loop buckle 8, a strap 9, a Bowden wire insertion port 10, a pulley steering mechanism 11, an aluminum buckle 12, a soft-rubber index-finger extension channel 13, a soft-rubber thumb adduction channel 14, a soft-rubber thumb extension channel 15, a soft-rubber thumb abduction channel 16, a soft-rubber thumb flexion channel 17, a soft-rubber index-finger flexion channel 18, and a buckle mounting recess 19. The whole soft rubber glove 3 is made of 30° soft rubber, has high flexibility, and can be tightly worn on the hand of the user. The buckle 7 is mounted in the buckle mounting recess 19 by using a pin, and a plurality of through holes is made in the strap 9. During wearing of the soft rubber glove 3, the strap 9 is passed through the buckle 7, a tongue of the buckle 7 is passed through one through hole of the strap 9 to achieve fastening, and the remaining strap 9 is inserted into the strap loop buckle 8. Such a design mode combing the strap and buckle can easily adjust the tightness of the soft rubber glove 3. After study on the anatomical structure of the human hand and a fingertip movement trajectory, a rope trajectory of dragging the thumb and the index-finger is designed. Because the soft rubber cannot be made into a complicated structure, in order to facilitate doctors and patients to observe the movement of the rope in the soft rubber glove 3, the present invention adopts a segmented manner to design the soft-rubber index-finger extension channel 13, the soft-rubber thumb adduction channel 14, the soft-rubber thumb extension channel 15, the soft-rubber thumb abduction channel 16, the soft-rubber thumb flexion channel 17, and the soft-rubber index-finger flexion channel 18 on the soft rubber glove 3. For ease of subsequent connection of the rope and an actuator, the Bowden wire insertion port 10 is provided on the soft rubber glove 3. The rope is threaded through the Bowden wire insertion port 10 and is connected to the actuator, avoiding the wire from directly contacting the human body and preventing possible secondary injuries. Moreover, the Bowden wire insertion port can effectively change the direction of the driving force, enabling arbitrary placement of the actuator.

Figure 4:
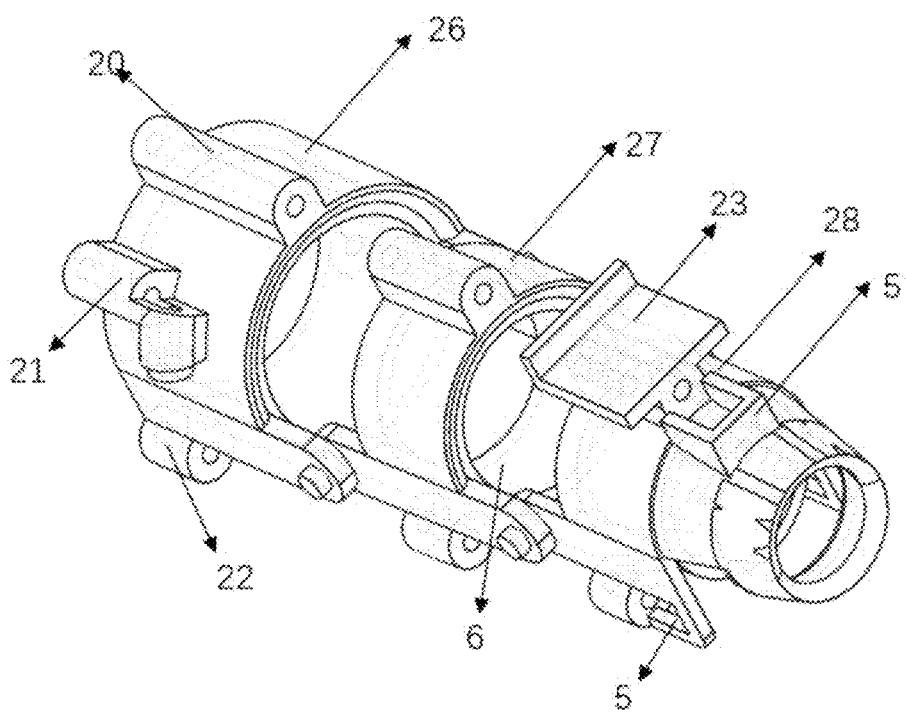
FIG. 4 is an overall structural diagram of an index-finger exoskeleton mechanism.

FIG. 4 is an overall structural diagram of the index-finger exoskeleton mechanism, which is used as an example to describe the four finger exoskeleton mechanisms. The other three finger exoskeleton mechanisms have a similar structure, and the index-finger exoskeleton mechanism includes an index-finger proximal phalanx loop 26, an index-finger middle phalanx loop 27, and an index-finger distal phalanx loop 28. Index-finger extension channels 20 are respectively disposed at the centers of top ends of the three loops, and corresponding to the center line of the index-finger of the human hand. The rope passes through the soft-rubber index-finger extension channel 13 of the soft rubber glove 3 and then through the index-finger extension channels 20, and finally is fastened in an aluminum buckle groove 5 on the index-finger distal phalanx loop 28 via an aluminum buckle. Index-finger flexion channels 22 are respectively disposed at the two sides of the bottom end of each loop, and the centers of the channels are corresponding to the center line of the index-finger of the human hand. One rope passes through the soft-rubber index-finger flexion channel 18 of the soft rubber glove 3, and then is converted into two sub-ropes via the aluminum buckle. Then the two sub-ropes respectively pass through the index-finger flexion channels 22 at the two sides, and are finally fastened in the aluminum buckle groove 5 on the index-finger distal phalanx loop 28 via the aluminum buckle. A thumb adduction channel 21 is disposed at the right side of the index-finger proximal phalanx loop 26. The rope passes through the soft-rubber thumb adduction channel 14 of the soft rubber glove 3 and then through the thumb adduction channel 21, and finally is fastened in an aluminum buckle groove 5 on a thumb distal phalanx loop 30 of the thumb exoskeleton mechanism 2. Hook and loop fasteners 6 are adhered inside each loop, and used to change the size of the loop according to the finger thickness. A sensor platform 23 is disposed on the index-finger distal phalanx loop 28, which facilitates placement of an IMU attitude sensor in subsequent application of the invention.

Figure 5:
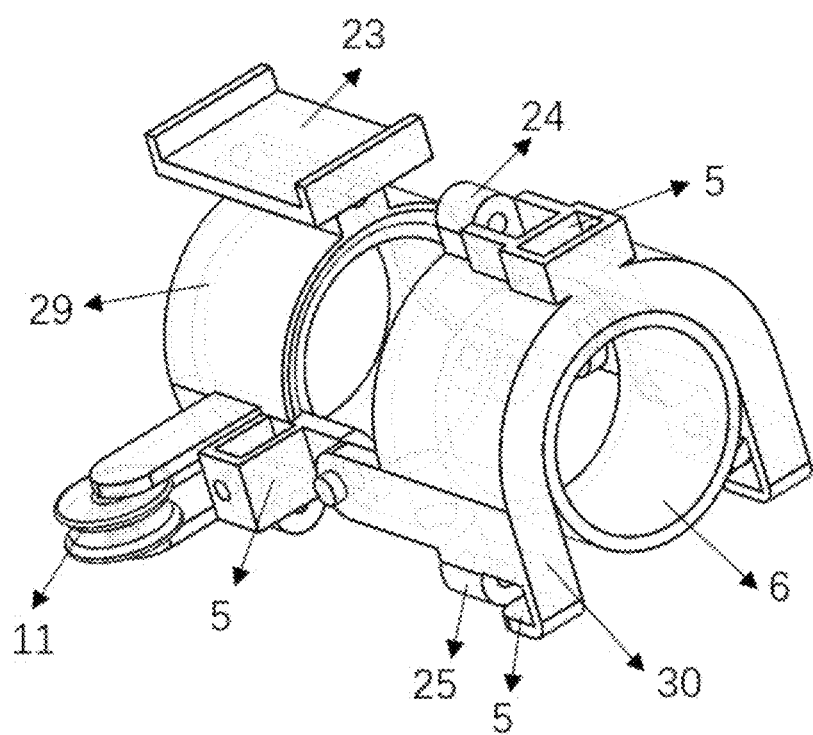
FIG. 5 is an overall structural diagram of a thumb exoskeleton mechanism

FIG. 5 is an overall structural diagram of the thumb exoskeleton mechanism, which includes a thumb proximal phalanx loop 29 and a thumb distal phalanx loop 30. Thumb extension channels 24 are disposed at the centers of the top ends of the two loops respectively, and corresponding to the center line of the thumb of the human hand. The rope passes through the soft-rubber thumb extension channel 16 of the soft rubber glove 3 and then through the thumb extension channels 24, and finally is fastened in the aluminum buckle groove 5 on the thumb distal phalanx loop 30 via an aluminum buckle. Thumb flexion channels 25 are respectively disposed at the two sides of the bottom end of each loop, and the centers of the channels are corresponding to the center line of the thumb of the human hand. One rope passes through the soft-rubber thumb flexion channel 17 of the soft rubber glove 3 and then is converted into two sub-ropes via the aluminum buckle. Then the two sub-ropes respectively pass through the thumb flexion channels 25 at the two sides, and are finally fastened in the aluminum buckle groove 5 on the thumb distal phalanx loop 30 via the aluminum buckle. A pulley steering mechanism 11 is disposed at the right side of the thumb proximal phalanx loop 29. The rope runs through the soft-rubber thumb abduction channel 16 of the soft rubber glove 3, then passes through the pulley steering mechanism 11, and is finally fastened in an aluminum buckle groove 5 on the thumb proximal phalanx loop 29, so that the rope applies a force on the finger in a direction vertical to the finger, thus facilitating force transmission and control. A sensor platform 23 is disposed on the thumb proximal phalanx loop 29, which facilitates placement of an attitude sensor in subsequent application of the invention.

The present invention has a simple structure and is easy to operate. Compared to the conventional rigid-exoskeleton hand rehabilitation equipment, the present invention solves the oversize problem of the rigid exoskeleton. A palm part is made of a soft rubber. Due to suppleness and flexibility of the soft rubber, the rehabilitation device of the present invention can be worn tightly and is easily suitable for the hand of the user. The finger parts are made by means of 3D printing with lightweight resin, adding rigidity to the whole device and improving rope control precision in later period. Because the finger phalanxes are clearly visible, the interphalangeal joints are laterally designed and are mutually connected via a hinge structure. Further in consideration of finger centering, the joints are partially exposed, improving comfort and safety during rehabilitation training.

The technical means disclosed in the solution of the present invention are not limited to the technical means disclosed in the above embodiments, but also include technical solutions composed of any combination of the above technical features. It should be noted that, several improvements and modifications may be made by those of ordinary skill in the art without departing from the principle of the present invention, and these improvements and modifications should also be considered within the protection scope of the present invention.

What is claimed is:

1. A rope-driven soft hand function rehabilitation device, comprising: four finger exoskeleton mechanisms, a thumb exoskeleton mechanism, and a soft rubber glove, wherein the four finger exoskeleton mechanisms comprise an index-finger exoskeleton mechanism, a middle-finger exoskeleton mechanism, a ring-finger exoskeleton mechanism, and a little-finger exoskeleton mechanism,
   wherein the soft rubber glove comprises a strap loop buckle, a strap, a Bowden wire insertion port, a pulley steering mechanism, an aluminum buckle, a soft-rubber index-finger extension channel, a soft-rubber thumb adduction channel, a soft-rubber thumb extension channel, a soft-rubber thumb abduction channel, a soft-rubber thumb flexion channel, a soft-rubber index-finger flexion channel, and a buckle mounting recess,
   wherein the buckle is mounted in the buckle mounting recess by using a pin, and a plurality of through holes is made in the strap; the strap is configured to be passed through the buckle, a tongue of the buckle is passed through one through hole of the strap to achieve fastening, and the remaining strap is inserted into the strap loop buckle;
   a rope is threaded through the Bowden wire insertion port and is connected to an actuator; the actuator is configured to change a direction of a driving force generated by a motor; and
   the soft-rubber index-finger extension channel, the soft-rubber thumb adduction channel, the soft-rubber thumb extension channel, the soft-rubber thumb abduction channel, the soft-rubber thumb flexion channel, and the soft-rubber index-finger flexion channel are provided on a surface of the soft rubber glove.

2. The rope-driven soft hand function rehabilitation device according to claim 1, wherein the soft rubber glove is attached to the hand of the user by a buckle and the strap; and the four finger exoskeleton mechanisms and the thumb exoskeleton mechanism are made by 3D printing with a nylon material, and are fastened to fingers of the user with hook and loop fasteners in a size adjustable manner.

3. The rope-driven soft hand function rehabilitation device according to claim 1, wherein the index-finger exoskeleton mechanism comprises an index-finger proximal phalanx loop, an index-finger middle phalanx loop, and an index-finger distal phalanx loop, interphalangeal joints are laterally designed and are mutually connected via a hinge structure, making the centers of the exoskeleton joints and the distal phalanx joints coincident, hook and loop fasteners are adhered inside each loop, and a sensor platform is disposed on the index-finger distal phalanx loop and an IMU attitude sensor is placed on the sensor platform; and
   the thumb exoskeleton mechanism comprises a thumb proximal phalanx loop and a thumb distal phalanx loop, interphalangeal joints are laterally designed and are mutually connected via a hinge structure, making the centers of the exoskeleton joints and the interphalangeal joints coincident, a size of the loops is adjustable with the hook and loop fasteners, and a sensor platform is disposed on the thumb proximal phalanx loop and an IMU attitude sensor is placed on the sensor platform.

4. The rope-driven soft hand function rehabilitation device according to claim 3, wherein a rope aluminum sleeve groove is separately disposed on tail ends of the four finger distal phalanx loops and a tail end of the thumb distal phalanx loop, to fix a tail end of the rope.

5. The rope-driven soft hand function rehabilitation device according to claim 4, wherein a through hole is made in the middle of a top end of each loop, and the rope passes through the through hole and is fixed at the tail ends of the four finger distal phalanx loops and the tail end of the thumb distal phalanx loop, wherein when the rope is pulled, fingers of a user are driven to extend; and two through holes are respectively made at two sides of a bottom end of each loop, and two ropes respectively pass through the through holes to be fixed at the tail ends of the four finger distal phalanx loops and the tail end of the thumb distal phalanx loop, wherein when each rope is pulled, the fingers of the user are driven to flex.

6. The rope-driven soft hand function rehabilitation device according to claim 4, wherein a diversion hole is provided at a right side of the index-finger proximal phalanx loop, and the rope passes through the diversion hole and is fixed on the thumb distal phalanx loop, wherein when the rope is pulled, a force is exerted in a direction vertical to the fingers, to drive the user to adduct the thumb.

7. The rope-driven soft hand function rehabilitation device according to claim 4, wherein the pulley steering mechanism is disposed at a right side of the thumb proximal phalanx loop, and is configured to change a rope tension direction to make a force act vertically on the fingers.

8. The rope-driven soft hand function rehabilitation device according to claim 1, wherein the middle-finger exoskeleton mechanism, the ring-finger exoskeleton mechanism, and the little-finger exoskeleton mechanism are similar to the index-finger exoskeleton mechanism in structure; and the soft rubber glove is a soft exoskeleton made of a soft rubber; when being used, the four finger exoskeleton mechanisms and the thumb exoskeleton mechanism are aligned with center lines of the corresponding fingers, and finger joints are exposed.

\* \* \* \* \*